US006536513B1

(12) United States Patent
Font-Freide et al.

(10) Patent No.: US 6,536,513 B1
(45) Date of Patent: Mar. 25, 2003

(54) HEAT EXCHANGE APPARATUS AND METHOD OF USE

(75) Inventors: Josephus Johannes Helena Maria Font-Freide, Sugar Land, TX (US); John Wilson Kippax, North Allerton (GB); Geoffrey Gerald Weedon, Bayshore (TT); William Terence Woodfin, Hook (GB)

(73) Assignees: BP Exploration Operating Company Limited, London (GB); Kvaerner Process Technology Limited, London (GB)

( * ) Notice: Subject to any disclaimer, the term of this patent is extended or adjusted under 35 U.S.C. 154(b) by 0 days.

(21) Appl. No.: 09/662,835

(22) Filed: Sep. 15, 2000

Related U.S. Application Data

(63) Continuation of application No. 09/261,653, filed on Mar. 3, 1999.
(60) Provisional application No. 60/051,898, filed on Jul. 8, 1997.

(30) Foreign Application Priority Data

Jun. 24, 1998 (GB) .............................. PCT/GB98/01840

(51) Int. Cl.⁷ .............................. F28F 9/22; F28D 7/10
(52) U.S. Cl. ...................................... 165/159; 165/140
(58) Field of Search .................. 165/158, 159, 165/160, 161, DIG. 409, DIG. 412, 415, 416, 140

(56) References Cited

U.S. PATENT DOCUMENTS

| | | | |
|---|---|---|---|
| 1,703,655 A | 2/1929 | Beekley et al. | |
| 2,496,301 A | 2/1950 | Meixi | |
| 2,665,944 A | 1/1954 | Lansing et al. | |
| 2,873,098 A | 2/1959 | Morgan | |
| 2,991,048 A | * 7/1961 | Rabin | 165/159 |
| 3,285,713 A | 11/1966 | Poehler et al. | |
| 3,670,522 A | * 6/1972 | Bresin | 165/140 |
| 3,884,643 A | 5/1975 | Ballestra et al. | |
| 4,049,048 A | * 9/1977 | Leedham | 165/159 |
| 4,286,436 A | * 9/1981 | Engdahl et al. | 165/141 |
| 4,312,184 A | * 1/1982 | Mangus | 165/140 |
| 5,099,656 A | 3/1992 | Martineau | |
| 5,238,057 A | 8/1993 | Schelter et al. | |
| 5,291,944 A | 3/1994 | Sanz et al. | |
| 5,595,242 A | * 1/1997 | Jekerle et al. | 165/154 |
| 5,893,411 A | * 4/1999 | Nir | 165/140 |

FOREIGN PATENT DOCUMENTS

| | | | | |
|---|---|---|---|---|
| DE | 1 039 040 | | 9/1958 | |
| DE | 41 38 827 A | | 3/1993 | |
| EP | 0 068 057 A | | 1/1983 | |
| GB | 24460 | * | 7/1981 | ............ 165/140 |
| GB | 2065859 | * | 7/1981 | ............ 165/140 |

* cited by examiner

Primary Examiner—Henry Bennett
Assistant Examiner—Tho Duong
(74) Attorney, Agent, or Firm—Nixon & Vanderhye

(57) ABSTRACT

A heat exchanger comprises a plurality of first heat exchange tubes extending through the exchanger, and through a plurality of laterally extending heat exchanger chambers, each chamber having at least one entry from a first chamber and at least one exit to a second axially adjacent chamber, and each chamber having a plurality of transverse interconnecting zones, each of which is defined by at least two of said tubes, and at least one first zone has an entry to said first chamber and at least one second zone, different from said first zone, has an exit to said second chamber. Also included is a vessel for mixing or distributing streams of a first fluid passing axially from an upstream to a downstream location, which comprises transverse baffles across said vessel in at least two successive rows, which rows of baffles define an open transverse chamber, the baffles in successive rows having a different spatial distribution across the vessel. Preferably the apparatus has the heat exchanger with the distributor downstream of it, and the whole apparatus is a compact reformer.

13 Claims, 4 Drawing Sheets

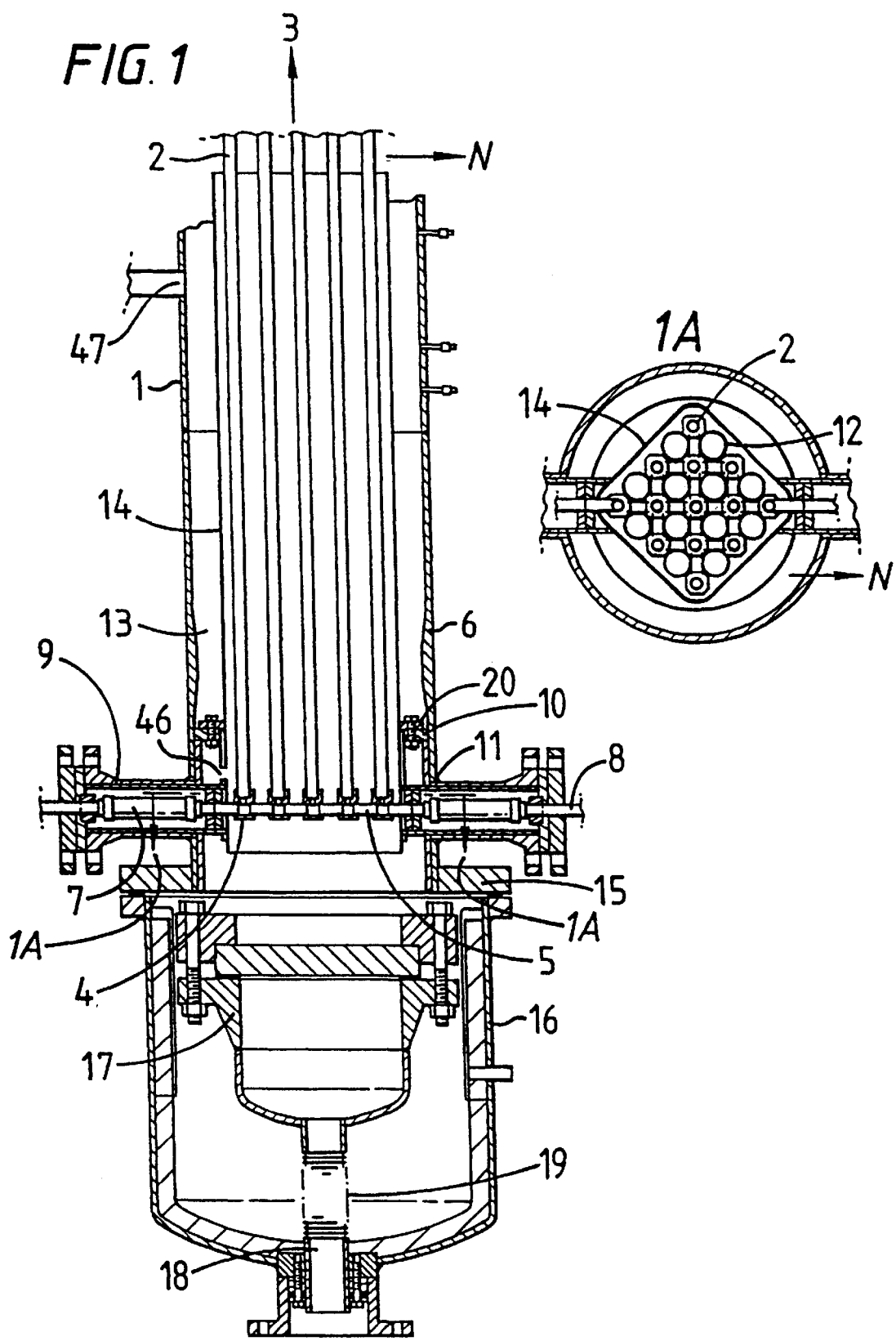

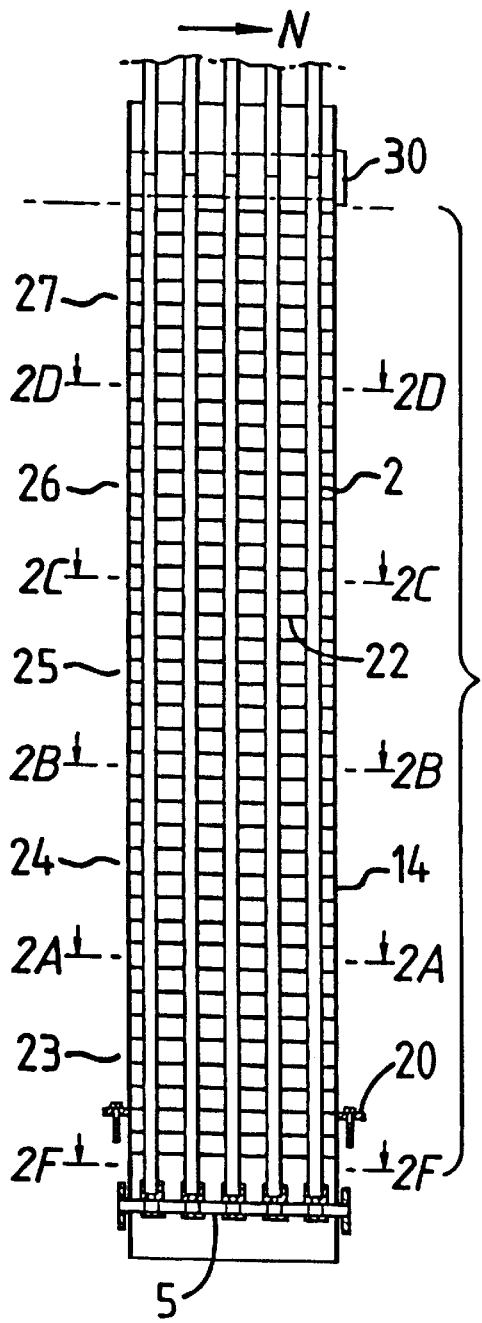
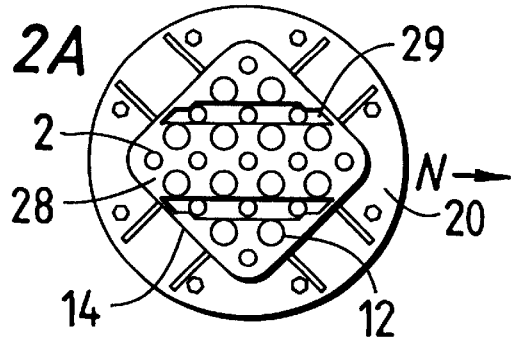
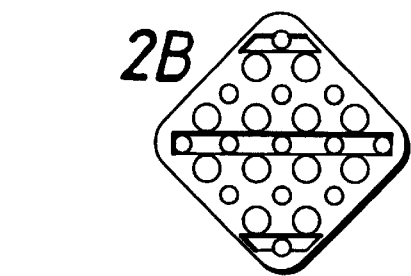
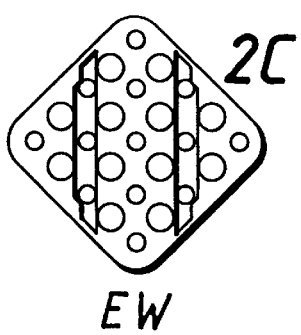
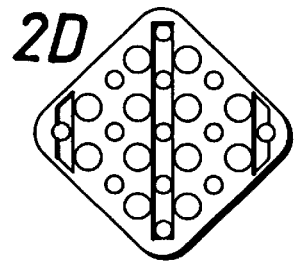
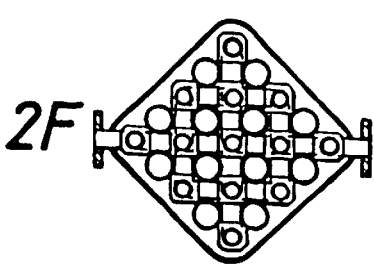

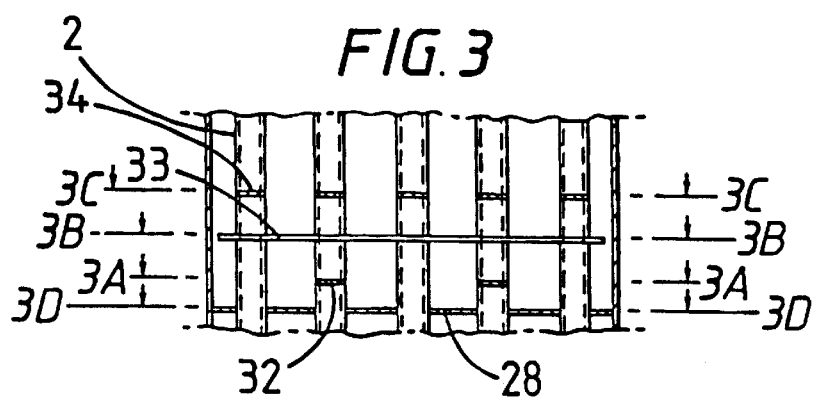
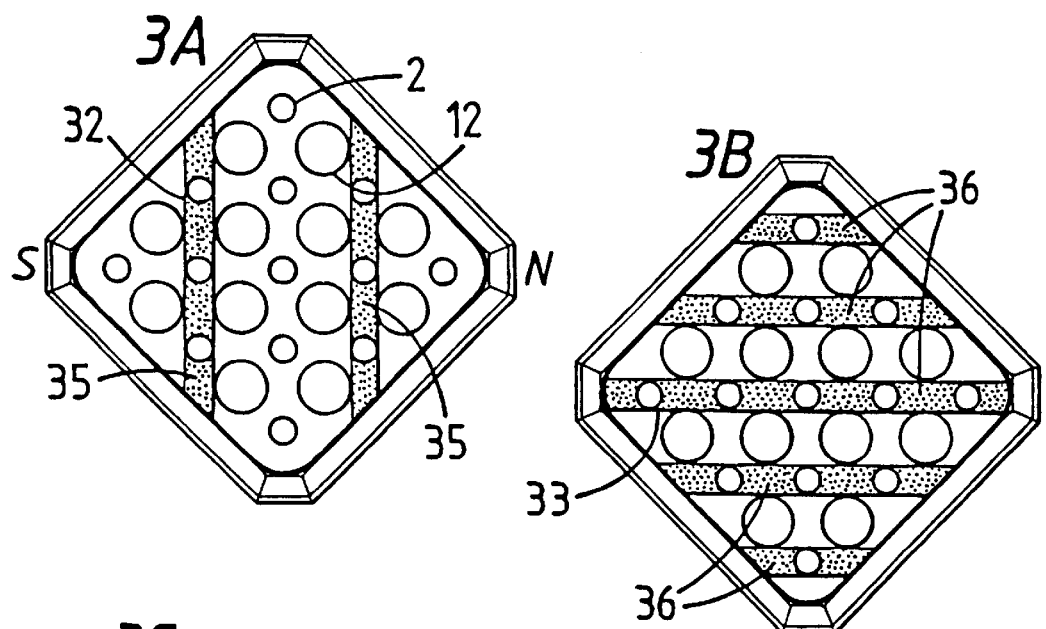
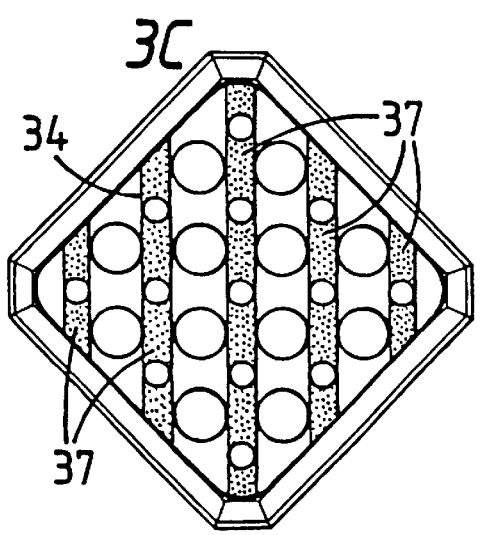
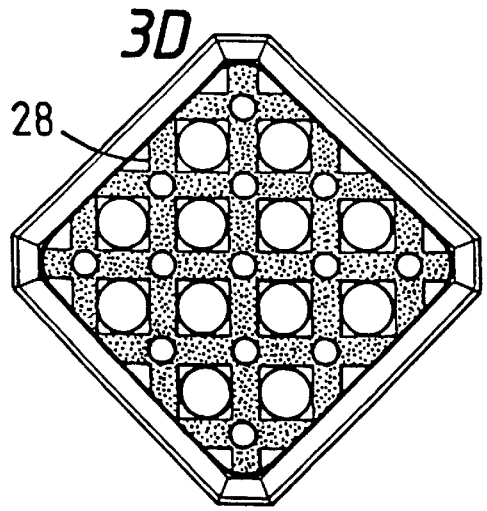

HEAT EXCHANGE APPARATUS AND METHOD OF USE

This application is a continuation of Ser. No. 09/261,653 filed Mar. 3, 1999 which claims benefit of Provisional No. 60/051,898 filed Jul. 8, 1997.

The present invention relates to an apparatus for heat exchange between fluids and/or for mixing of fluids, those fluids being different and/or at different temperatures.

In many process operations there are heat exchangers involving transfer of heat from a first to a second fluid. The exchange may be to cool exhaust gases from a combustion reaction and/or to preheat gases prior to reaction. The two fluids may move in countercurrent or cocurrent directions and may move with one fluid in a core and the other in a surrounding shell, or one may move in a tube or tubes passing thorough a chamber containing the other fluid. In EPA-450872 a compact reformer has reaction tubes for an exothermic reaction inside a chamber packed with catalyst for an endothermic reaction. The exiting endothermic reaction products in the chamber preheat the exothermic reactants passing in a core and surrounding annulus inside the chamber. In EPA-643618 and EPA-703823 the endothermic reaction occurs in the tubes and the exothermic reaction in the chamber, and the exothermic reactants are preheated by passage in annuli surrounding the exit endothermic tubes. In EPA-703823 one preheated exothermic reactant, usually air, passes into the reaction chamber through a perforated distribution plate, which forms a wall of air which moves up the chamber until it meets the preheated fuel outlets at which time autoignition occurs to produce flames which pass around and along the endothermic tubes to effect reaction therein. The exiting combustion gases from the exothermic reaction preheat the incoming endothermic reactant.

The above arrangements do not give as uniform preheating of the exothermic reactants as may be desired, nor as uniform a temperature distribution of the air entering the reaction chamber as may be desired.

The present invention concerns apparatus for and methods of obtaining greater uniformity in the preheating and/or temperature distribution.

The present invention provides a heat exchanger, which comprises a plurality of first heat exchange tubes extending through the exchanger, and through a plurality of laterally extending heat exchanger chambers, each chamber having at least one entry from a first chamber and at least one exit to a second axially adjacent chamber, and each chamber having a plurality of transverse interconnecting zones, each of which is defined by at least two of said tubes, and at least one first zone has an entry to said first chamber and at least one second zone, different from said first zone, has an exit to said second chamber.

The present invention provides a heat exchanger, which comprises a plurality of first heat exchange tubes extending through the exchanger and through a plurality of laterally extending heat exchanger chambers comprising a first chamber and a second and third chamber axially adjacent thereto and on either side thereof, each chamber being separated from each adjacent chamber by a partition, in which are a plurality of discrete openings, and each chamber having a plurality of transverse interconnecting zones, each of which is defined by at least three of said tubes, a first partition and a second partition opposing said first partition, and with said openings in different zones and a passage through said zones between at least one first opening in a first partition and at least one second opening in said first partition, and at least a third and a fourth opening in said second partition.

The present invention also provides a process for effecting heat exchange between a first fluid passing through a vessel and a second fluid in a plurality of first tubes extending through said vessel and through a plurality of laterally extending heat exchange chambers, each chamber having a plurality of transverse interconnecting zones, which comprises passing at least one stream of said first fluid into a first chamber, effecting contact of said fluid and more than one of said tubes and then passing a stream of said fluid subsequent to said contact from said first chamber into a second chamber axially adjacent to said first chamber, so that said fluid passes through said chambers in an axial and lateral direction.

The present invention also provides a process for effecting heat exchange in a vessel between a first fluid passing through a plurality of laterally extending heat exchange chambers in said vessel in mutual axial relation in said vessel and a second fluid passing in a plurality of first tubes, which extend through said vessel and through said chambers, each chamber having a plurality of transverse interconnecting zones, which comprises passing at least two streams of said first fluid into different zones in a first chamber, effecting contact of each of said first streams and more than one of said tubes to give second and third streams, mixing said second and third stream in a different zone to produce a mixed stream and passing said mixed stream from said different zone into a second chamber axially adjacent to said first chamber, so that said fluid passes through said chambers in an axial and lateral direction.

The heat exchanger is a hollow vessel containing the plurality of chambers and the heat exchange tubes. The vessel may be of curved, e.g. circular, or ellipsoidal, or rectilinear e.g. square or rectangular cross section, and may have a longitudinal axis substantially normal to its radial axis, as in a right cylinder. Preferably its height to width ratio is 10:1 to 2:1. The vessel may be of metal, e.g. steel, or insulating material, e.g. brick or stone, construction and especially in the case of a metal walled vessel, may have an insulating external layer.

The first heat exchanger tubes are of heat conducting material such as carbon fibre reinforced material or ceramics but preferably of metal, especially high temperature resistant steel. The tubes may be dispersed in the vessel in a random or regular array, in particular in at least 2 such as 2–6 rows, in which the tubes in adjacent rows may be in line or offset with respect to one another. The tubes may be parallel in one or two directions, so any tube is a member of two rows, the axis of one row being normal to the axis of the adjacent row or at 45° to said latter axis; the axis of one row may also be normal to the axis of the next row beyond the adjacent row. Thus the tubes may be in rectilinear rows, each tube being a constant distance from each of its 4 nearest neighbouring tubes or having 8 nearest neighbours, 4 of these at one distance and the next 4 at a longer distance. The tubes may also be in non rectilinear arrays. There may be at least 2, e.g. at least 10, first heat exchange tubes such as 2–5000, preferably 10–576, first heat exchange tubes in the vessel. They may be distributed in a square or rectangular pattern in the vessel, preferably in a square pattern and with the number of tubes in each row the same or alternating by one. They may be in a triangular pitch or a rectilinear pitch, e.g. square pitch, the rows in the rectilinear pitch being optionally parallel to or at 30–60°, e.g. 45°, to the walls of a notional or actual sheath surrounding the outermost of the tubes in the array in the vessel.

The first tubes may extend through the vessel reactor linearly, especially in a direction parallel to the longitudinal axis of the vessel, in particular for right cylindrical vessels. For rectangular vessels the tube axis is usually parallel to a longitudinal edge. Advantageously the tubes pass through opposed faces, e.g. top and bottom of the vessel. However the tubes may also pass at any angle through one of said opposed faces, rather than substantially normal thereto, and may pass through a side face of the vessel. The tube may also pass in a non-rectilinear fashion, e.g. in a curved fashion, which may be in a single plane, as in an arc of constant or varying radius, or in a serpentine fashion, e.g. a sinusoidal fashion, or the tube may be in more than one plane, e.g. in a regular or irregular helix.

The exchanger usually has insulation either surrounding the external wall of the vessel and/or in a layer on the inside of that wall.

The vessel is subdivided axially with a plurality of laterally extending chambers, each chamber usually extending across the full internal width of the vessel. There may be at least 2, such as at least 5, such chambers especially 2–200 or 10–60. The first tubes pass through more than one chamber, especially through each chamber. The chambers preferably extend laterally normal to the longitudinal axis of at least one tube passing through it, in particular all of said tubes, and/or extend laterally normal to the longitudinal axis of the vessel, especially both. The relative height (axial length) of the chamber to the lateral width of zones in said chamber i.e. the gap between said first tubes is usually up to 10:1, e.g. 0.1:1 to 10:1, such as up to 5.0:1, e.g. 0.2–3.0:1, 0.2–0.8:1 or 1–2:1. Advantageously the individual chambers are substantially parallel to one another, so the first and second partitions which constitute floors and ceilings of each chamber are preferably substantially parallel.

Each chamber is subdivided into a number of transverse zones (e.g. at least 10 zones such as 10–1000), the relation of which to each other and other chambers will be described with reference to the first chamber, and the second and third chambers adjacent to it on either side.

The first chamber has among its zones, at least two and preferably 6, such as 6–50 entry zones, in which each zone has an opening to entry from the second chamber and at least two, and preferably at least 6, such as 6–50, exit zones, in which each zone has an opening to exit into the third chamber. The relation between the number of zones to the number of tubes may be up to 2:1, e.g. 0.5–2.2:1, while the ratio between the number of entry zones to the number of exit zones in any one chamber is usually 0.5–2:1, e.g. 0.1–1.2:1, preferably substantially 1:1. The zones usually extend in both lateral directions throughout the chamber and substantially all the chamber has been divided into zones. The zones usually interconnect with each other in the chamber and the majority especially substantially all, usually interconnect with zones in neighbouring chambers as described further below. Ignoring the space between the outermost tubes and the walls of the vessel, each zone is defined by the walls of at least 3 or 4 tubes passing through the chamber. The zone is defined by at least 3 tubes when these are arranged in a triangular pattern and by at least 4 tubes when these are in a square or rectangular pattern. Irregular patterns of tubes can require at least 3–6 tubes to define a zone. Each zone has at least 1 and usually 2 tubes common to its neighbouring zone.

A first zone has an entry from the next (e.g. second) chamber and a second zone has an exit to the other adjacent (e.g. third) chamber. No zone has both such an entry and such an exit, so the first and second zones are different. At least one first entry zone may be adjacent to at least one second exit zone, or may be spaced from the second zone by at least one, e.g. 1–4, but especially 1 third zone, which has neither such entry nor such exit. Thus advantageously an entry zone may be spaced by a third zone from an exit zone, which is itself spaced by a further third zone from a further entry zone; thus 6 zones in question are preferably in a straight line across the width of the chamber. Alternatively an entry zone may be adjacent to an exit zone, itself adjacent to a further entry zone, all the zones preferably in a straight line across the chamber. Preferably the entry and exit zones in each of the second, first and third zones are in the same plane, so the first fluid moves up the vessel in that plane. When the exit zone is surrounded by 2 or more entry zones in one, e.g. the first chamber, then the overall effect is to mix the portions of the first fluid entering the first chamber via the entry zones and eject them through the exit into the next, e.g. third chamber, whereupon a portion passes to one exit zone in that chamber and another portion passes to another exit zone in that chamber. In this way the fluid is divided, mixed and redivided and remixed with the same or different streams of fluid, in each case with contact of 2 or more tubes in each zone. By this means the temperature of fluid in each chamber progressively becomes more uniform as the fluid moves up the vessel from chamber to chamber.

In each chamber there are usually at least 4 zones in any linear direction, and especially 0–3 zones, e.g. 0–1 zones, between each entry zone and each exit zone. In particular at least one entry zone is spaced from the vessel wall by at least one, e.g. 1–3, such as 1 tube, and especially at least one, e.g. 1–3, such as 1 zone; the nearest exit zone from said entry zone is also preferably spaced from the vessel wall by at least one, e.g. 1–3, such as 1 tube or especially at least one, e.g. 1–3, such as 1 zone. In addition each chamber preferably has at least 2 entry zones spaced apart and at least 2 exit zones spaced apart, all in a straight line across the chamber in particular with 0 or 1 zones between each entry and exit zone.

The first heat exchange tubes may be the only ones passing through the chambers, but preferably there is at least one second heat exchange tube passing through the chambers. The diameters, cross section shapes and areas of the first and second (and any subsequent tubes) may be the same or different; preferably the first tubes are larger and may be for countercurrent heat transfer to the first fluid passing through the vessel while the second tubes may be smaller and for cocurrent heat transfer from the first fluid or countercurrent radiation heat transfer from the first tubes. The second and further tubes may be symmetrically disposed with respect to said first tube, e.g. equidistant to two or more first tubes. The second and further tubes may be arranged regularly as described above with the first tubes: in particular the first and second tubes are in rows which are parallel in two directions to one another. Thus, preferably there is a first regular array of said first exchange tubes and a second regular array of second heat exchange tubes axially extending through the exchanger and preferably of different diameter from said first exchange tubes. The second tubes are preferably in alternate rows with the first tubes, in line therewith or especially offset therefrom, i.e. with each tube of one kind at the centre of a square (in plan view) with 4 nearest neighbours of another kind at the corners of the square. The second tubes may alternate with first tubes in 2 directions normal to one another or only in one of those directions. The tube centre/tube centre spacing between the first tubes in any direction may be the same or different from that spacing between the second tubes in that direction and that spacing between the first and second tubes may be the same or different from either of the above spacings. Preferably all these tube centre/tube centre spacings are substantially the same. The ratio of the number of first tubes to second tubes may be 1:3 to 3:1, especially 10–14 to 14–10, or substantially 1:1. The first tubes may be arranged with a triangular pitch with the second tubes in each alternate triangle, or may be in a rectilinear, especially square pitch.

The presence of first and second heat exchange tubes passing through the heat exchanger chambers is a particularly important aspect of the invention especially in the method of the invention in which a first fluid passes through the chambers, and a second fluid passes through the first tubes, while a third fluid passes through the second tubes, the direction of flow of the second fluid is counter current to that of the third fluid, and to the overall axial flow of the first fluid.

At least one of the first and second heat exchange tubes, preferably the first tubes and optionally both, is provided with means for enlarging the effective external surface area thereof. The enlargement means may be integral with the tube, or non integral therewith but in direct thermal contact with the tube; both kinds of enlargement means may be present if desired. The enlargement means is usually one or more fins or ribs on the tube, the fins or ribs being continuous or discontinuous through the chamber. They may be straight or curved e.g. spiral or helical along the tube length in the chamber. The non integral enlargement means may be in the form of a heat conducting body having one or more fin or rib, said body being extended round the tube in the chamber, with or without attachment to the tube. Conveniently the non integral means may have a fin or rib extending outwardly from, e.g. normal to, a base, which may have a flat surface for contacting the tube; thus this means may be a flexible elongate body of T-shaped cross section tightly wound round the tube to provide good thermal contact between the tube and the base and hence provide heat to the fin or rib.

In the method of the invention, a second fluid, e.g. a gas or a liquid or mixture thereof, moves in the first tubes and heat is transferred between the tube walls and the first fluid (e.g. a gas or liquid or mixture thereof) passing through the zones in each chamber. A first stream of the first fluid may enter the first chamber, contact at least 2 of the tubes in the zones and pass into the second chamber; alternatively, or in addition, a first and second stream of the first fluid may separately enter the first chamber, each stream contacting at least one tube and then the first and second streams may mix and pass to the second chamber. Preferably each stream entering an entry zone in one chamber contacts at least 4, e.g. at least 8, heat exchange tubes before it leaves that chamber. Preferably the first fluid passes through successive chambers countercurrent to a second fluid passing through the first tubes, while especially a third fluid passes in the second tubes cocurrent with the first fluid and countercurrent to the second fluid. Advantageously the first and second fluids are gases and the third is a gas or a liquid, (especially when the second tube diameter is smaller than that of the first tube). In particular the second fluid is an endothermic reaction product, e.g. from steam reforming of a gaseous hydrocarbon, e.g. of 1–4 carbons such as methane, or a partial oxidation of such a hydrocarbon, while the first fluid is a gas comprising molecular oxygen such as air and the third fluid is a fuel, e.g. hydrogen or a gaseous hydrocarbon of 1–5 carbons such as methane, ethane, propane or butane or carbon monoxide. Advantageously heat is transferred from the second fluid via first tubes to the first fluids, and hence from first fluid to third fluid (via second tubes) especially to preheat the air and fuel before entering a combustion region of the vessel, the combustion heating up the endothermic reaction. If desired the first tubes may contain heat transfer solids, e.g. inert solids such as ceramic material and/or solid catalyst for the endothermic reaction. At least some of the heat transfer between the first tube and the second tube in the chambers is usually by radiation, e.g. at least 5% or 20%, such as 5–10%, 10–50%, or 20–40%, such as about 30%, the rest being primarily by convection.

Preferably in the process the first fluid passes through at least 1 and especially at least 2 successive chambers in one plane, e.g. 5–30 chambers, and then through at least 1 especially at least 2 successive chambers in a different plane, particularly at 45–135° to the first plane, e.g. substantially normal to it, e.g. a further 1–30 chambers; thereafter the plane of movement may be changed again, e.g. as before at least once more, such as 1–5 times further. If desired the plane of movement may be changed at a more frequent rate with increasing distance from the entry of first fluid.

The percentage of the entry and exit openings in any chamber to the total area of that chamber (i.e. including tubes) is usually 5–25%, e.g. 10–20%, while the percentage of the entry and exit openings in any chamber to the total area of that chamber excluding the tubes (i.e. the total area of the zones) is usually 25–50.

In the apparatus of the invention the individual chambers may have complete partitions, also called barriers herein, between them apart from the entry and exit openings mentioned above, so they have substantially complete floors and ceilings. The barriers may be otherwise impermeable to first fluid forcing all that fluid to pass from entry to exit zones before passing to the next chamber. However, if desired at least a portion, especially substantially all, of at least one barrier between successive chambers, especially substantially all such barriers, are foraminous, with the percentage of the area of the holes to the total area of the barrier of 10–70%, especially 30–60%. Such perforated barriers allow some passage of the first fluid from each chamber to the next other than via the entry and exit zones to reduce the back pressure and render the flow distribution even compared to use of solid barriers. Preferably however, the barriers are incomplete but not foraminous.

The entry and exit openings may be in the form of slots in sheets or plates, or spaces between separate baffles. The barriers may be of a regular or irregular shape with straight or curved sides, so that the entries and exits may be of circular, ellipsoid, rectangular, square or other cross section. One barrier may completely cover the roof of one or more zones; in particular there may be one or a series of barriers across the width of the vessel. Thus there may be a series of rows of barriers of similar shape, e.g. with parallel longitudinal or laterally extending sides; those may thus be the baffles mentioned above. The second tubes may pass through at least two and especially substantially all of these barriers with parallel lateral extending sides but preferably pass through only a proportion of said barriers especially at regular intervals, in particular through alternate barriers. When a series of successive chambers has parallel sided baffles, the sides of the baffles may be coplanar through at least 2 successive chambers, e.g. substantially all, or the sides may be parallel to those of the baffles in the next chamber but the sides may overlap (when viewed in plan view). There is thus effectively no axial line of sight between successive chambers, thereby forcing the first fluid to move laterally as well as axially between successive chambers especially in a serpentine manner. While baffles in one chamber may have sides parallel to the corresponding baffles in the adjacent chamber and/or axially colinear with those in the subsequent chamber, so that there may be 5–30 of such chambers, it is preferable periodically to have a series of baffles for first successive chambers with such parallel sides and then a series of baffles for the next successive chambers with mutually parallel sides, but at an angle, e.g. 45–135° such as substantially normal to those in the first series. This change for the next successive chambers may be repeated one or more times, each group of chambers having 1–50, e.g. 5–30, chambers. In this way portions of the first fluid move through the vessel in one plane, prior to moving through the vessel in a different plane usually normal to the first. Thus there may be an exchanger which comprises in successive chambers a first series of barriers with sides parallel in one direction and then a second series of barriers with sides parallel in a different direction; the first and second series of barriers may alternate. When there are first and second tubes there are preferably baffles between alternate rows of first tubes in said first chamber and baffles between different alternate rows of first tubes in said second chamber, said second tubes passing through said baffles.

The first chamber may have a first partition which is a floor (or roof to the second chamber) with 2 transverse parallel sided slots, and a second partition which is a roof (or floor to the third chamber) with 3 transverse parallel sided slots, the sides being axially coplanar with those in the first chamber, while for the floor of the second chamber there are 3 such slots etc; after this series of such chambers the next plane of the sides changes for the next series again with an alternating 2, 3, 2, 3 number of slots. Generically the numbers of slots may alternate by one between each successive chamber. The slots may thus go North/South for a series, then East/West, then North/South again. With the above arrangements of slots, the effect is preferably that the heat exchanger vessel when viewed in plan view has a regular pattern of tubes with baffles through which first tubes pass and with an arrangement of second tubes, slots and baffles through which the second tubes pass or are tangential thereto, the overall effect being that there is effectively no line of sight through the heat exchanger, so that the first fluid can only pass with axial and lateral motion, rather than axial alone.

Advantageously the heat exchange tubes are inside a reactor with 2 walls, preferably concentric walls. While both may be load bearing, advantageously the outer one is more load bearing than the inner one. The inner wall acts like a shroud or envelope surrounding all of the tubes to provide an annulus between the two walls, e.g. outer wall and shroud. The inner wall, e.g. shroud, is usually of heat conducting material, e.g. metal or carbon fibre reinforced material, and may be in contact with one or more heat exchange tubes, but preferably is spaced from each tube. The inner wall may be of the same axial cross section shape as the outer reactor wall, e.g. concentric circles, but preferably the axial sections shapes are different, e.g. the outer wall is circular and the inner one is ellipsoidal or rectangular, such as square. The shroud may also hold in place in the reactor the barriers or partitions present between the chambers, and hence may help to locate the tubes.

This annulus in the reactor between shroud and reactor wall can contain heat insulation, e.g. ceramic material, but preferably provides a preheating zone for first fluid prior to entry into the heat exchanger chambers at their upstream end; this zone also reduces the heat loss from the reactor by capturing the heat from the shroud and reusing it. The reactor wall may be provided at one or more locations, at least one of which is distant from upstream heat exchanger chambers and near to the downstream heat exchangers, with at least one orifice for entry of the first fluid, e.g. air, and especially fluid under compression, said orifice(s) being in the reactor wall of the annulus. There may be more than 1 orifice, especially 2–6, in particular spaced symmetrically about the longitudinal axis of the reactor, usually in a plane normal to that axis. The shroud or envelope at its end near to the upstream heat exchange chambers may have at least one entry location into that (or those) heat exchange chamber(s) in particular 1–3 entries, e.g. one, into the one or more of the 3 most upstream heat exchange chambers, especially the most upstream chamber. Thus in use the air, e.g. compressed air, enters the reactor through the orifice(s) into the annulus, passes through the annulus, where via the shroud it is in cocurrent heat exchange relationship with the first tubes and/or countercurrent heat relationship to the first fluid moving through the heat exchanger chambers; the first fluid may be preheated to at least 100° C. in this way before entry into the heat exchanger chamber from the annulus.

In one embodiment the process of the present invention also includes preheating the first fluid outside the heat exchanger chamber by heat exchange with first fluid inside said chambers, to give a preheated first fluid prior to entry of the preheated first fluid into heat exchanger chambers; advantageously the preheating is in a direction countercurrent to the direction of movement of first fluid in said chambers. In particular the first fluid is passed through an annulus between the shroud and reactor wall, the shroud providing an envelope surrounding the tubes.

The benefits of the heat exchanger and process of the invention may include a better heat distribution across the width of the vessel to the first fluid when leaving the exchanger, e.g. at the top, and/or to the second fluid when leaving the exchanger, e.g. at the bottom, through the first tubes. In a further aspect the present invention also provides a vessel for mixing or distributing streams of a first fluid passing axially from an upstream to a downstream location, which comprises transverse baffles across said vessel in at least two successive rows, which rows of baffles define an open transverse chamber, the baffles in successive rows having a different spatial distribution across the vessel. This arrangement of baffles may be present in a heat exchanger of the invention preferably after the first fluid has passed through the heat exchanger. Alternatively other heat exchanger systems may be used in combination with the above arrangement of baffles. The baffles can act as spoilers to break up the flow of the first fluid and distribute or mix it.

The arrangement of baffles may be used as a mixing device for fluids, different in temperature and/or composition, e.g. for mixing at least two different fluids, or one fluid in at least 2 streams at different temperatures. Preferably it is for mixing fluids at different temperatures, such as ones obtained from contact of one or more fluids with heat exchange surfaces, in particular ones extending through the vessel as in the first tubes in the above mentioned published references. If one of the tubes is at a different temperature from the rest, then first fluid passing it will be at a different temperature from the rest leading to lack of uniformity at the top of the heat exchanger, which this aspect of the present invention seeks to remedy with the special arrangement of baffles to give a substantially uniform temperature and composition fluid across the width of the vessel.

The arrangement of baffles is preferably used in a distribution device for fluids, e.g. ones having different axial velocities, in order to provide a flow of fluid across a wide area, e.g. the vessel width, of substantially constant velocity.

The first fluid may first contact the baffles in one or more than one stream, e.g. a stream emanating from contact of one or more fluids with heat exchange surfaces, in particular ones extending through the vessel as in the first tubes of the previous apparatus of the present invention. Preferably the fluid is air and the baffles provide a flow of air across the vessel of substantially constant velocity, e.g. as a wall of air, in particular when the air meets the fuel burners in the apparatus of the invention.

The vessel may as described above in respect of the heat exchanger in terms of shape and construction, though need not have the first (and other tubes) in it. Thus in the upstream location in the vessel the 2 streams of fluid may just have been passed into the vessel, or may be separate from but on top of a heat exchanger with heat exchange surfaces, that heat exchanger being inside the vessel or outside it but with free movement of fluid from the exchanger into the vessel. In the former case, with baffles and exchanger in the same vessel, the heat exchange surfaces may extend through the region of the vessel containing the transverse baffles or may be absent therefrom, e.g. stop in the vessel below the baffles.

The baffles may be impermeable to the fluids, but preferably are foraminous, the total area of the holes in the baffles being 10–60%, e.g. 30–50%, of the total area of the baffles, and the size of the individual holes being preferably on average less than one fifth of the size of any heat exchange tubes passing through them, e.g. one twentieth to one fifth of the size. Advantageously the holes are all substantially the same size, especially in any particular row, though the holes in successive rows may be also of the same size or of progressively increasing or especially progressively decreasing size.

The shapes of the individual baffles may be as described above for the barriers in the heat exchanger.

The baffles are preferably in a vessel with at least some tubes passing through them, the spatial relationship between the vessel and the tubes being preferably as described above in relation to the heat exchanger and tubes. In particular the vessel may have first tubes passing through it in one regular array, and second tubes passing through it in a different way; the description above provides further details on the spatial arrangement of the tube arrays. The first and second tubes may be in rows parallel to one another or at 30–60°, e.g. 45° to one another. In particular, a pair of rows of first tubes is preferably spaced by a row of second tubes and/or vice versa, especially when the first and second tubes are in parallel rows in two directions at right angles. Preferably each first tube is surrounded by 4 second tubes and each second tube is surrounded by 4 first tubes (apart from tubes adjacent to the vessel wall). The relation between the tubes and the baffles is preferably as follows. The second tubes may pass between, but preferably pass through, at least some of the baffles. The baffles may have laterally extending parallel sides, extending across substantially the internal width of the vessel and are located between at least some of the first tubes, e.g. 2–4. The sides of the baffles in a first row are usually at an angle, e.g. 45–135°, or substantially normal to the sides of the baffles in a second adjacent row. Preferably the number of baffles in one row is one more or less than the number in the adjacent row. Advantageously with respect to a first row of baffles first and second tubes are in parallel rows interspaced between one another, and rows of parallel sided baffles have alternate rows of second tubes passing through them, while with respect to a second row of baffles adjacent to said first row of baffles, rows of parallel sided baffles in said second row have each row of second tubes passing through them and each row of first tubes passing between them, the direction of the sides of said baffles in the second row being substantially at right angles to the direction of the sides of the baffles in the first row; especially with respect to a third row of baffles adjacent to said second row of baffles, rows of parallel sided baffles in said third row have each row of second tubes passing through them and each row of first tubes passing between them, the direction of the sides of said baffles in the third row being substantially at right angles to the direction of the sides of the baffles in the second row, but substantially in the same direction as the sides in the first row. In particular the vessel has in combination the first, second and third row of baffles as described in the previous sentence; especially the 3 successive rows of baffles are perforated and are each disposed with respect to the tubes and the walls of the vessel such that in axial view the overall effect of the 3 rows is to appear to occupy at least 80% of the cross sectional area of the vessel, excluding the tubes.

The method of distributing according to the invention comprises a method of passing a first fluid axially through a vessel from an upstream to downstream location, wherein the fluid passes axially around successive rows of baffles laterally extending across the vessel, each successive row being in a different spatial relationship across the vessel, so that at least some of said fluid has lateral as well as axial movement. When more than one stream of said first fluid is passed into the vessel, the streams may be distributed separately in the method of the invention, but preferably the at least partly distributed streams, e.g. after the first row of baffles may be mixed, so the baffles overall effect a method of mixing. In particular at least a portion of a first stream of fluid passes axially between first tubes in a first row, and then passes axially and laterally between first and second tubes in a second row, and optionally through at least one perforated baffle in said second row, and preferably at least a portion of said first stream passes axially and laterally between first and second tubes in a third row and optionally through at least one perforated baffle in said third row.

In preferred aspects of the invention the heat exchanger of the invention has the distributor of the vessel of the invention downstream, e.g. on top of it. Extending in the vessel beyond the last baffle in a downstream direction are preferably the second tubes upon the end of each of which is mounted a fuel burner, e.g. a jet nozzle; advantageously the burner ends are in a transverse plane normal to the longitudinal axis of the heat exchange/mixer/vessel. The distributor and/or mixer arrangement of baffles provides a uniform temperature and velocity distribution of first fluid, e.g. air, which moves subsequently in the vessel up towards the burners while the air and fuel ignite (usually auto-ignite) producing elongate flames, which move around and along the first tubes so that the first tubes, which for the endothermic reaction, are immersed in a sea of flame. The exiting combustion gases from the burning in the vessel leave the vessel, optionally via an accelerated movement through an annulus of upwardly converging diameter, the annulus surrounding the incoming first tubes; in this way the endothermic reactants are preheated and then heated by the combustion of the exothermic reactants. The combined heat exchanger, mixer/distributor combustion vessel, (including burners), together with their associated first and second tubes can form a compact reformer for reforming hydrocarbons to carbon monoxide and hydrocarbon with maximum internal heat distribution and minimum temperature for the exiting endothermic and exothermic reaction products. If desired the heat exchanger, mixer and tubes may be supported in the external apparatus via means to absorb elongations and stresses due to expansion e.g. bellows on the tube sheets used to support the tubes.

The present invention is illustrated in and with reference to the accompanying drawings in which:

FIG. 1 is a cross section through the apparatus of the invention showing the heat exchanger and a section 1A through the exchanger.

FIG.2 is a schematic drawing of the heat exchanger and distributor and sections though the exchanger in planes 2A, 2B, 2C, 2D and 2F.

FIG.3 is a cross section through the distributor and burners and sections through the mixer in planes 3A, 3B, 3C and 3D.

Figure 4:
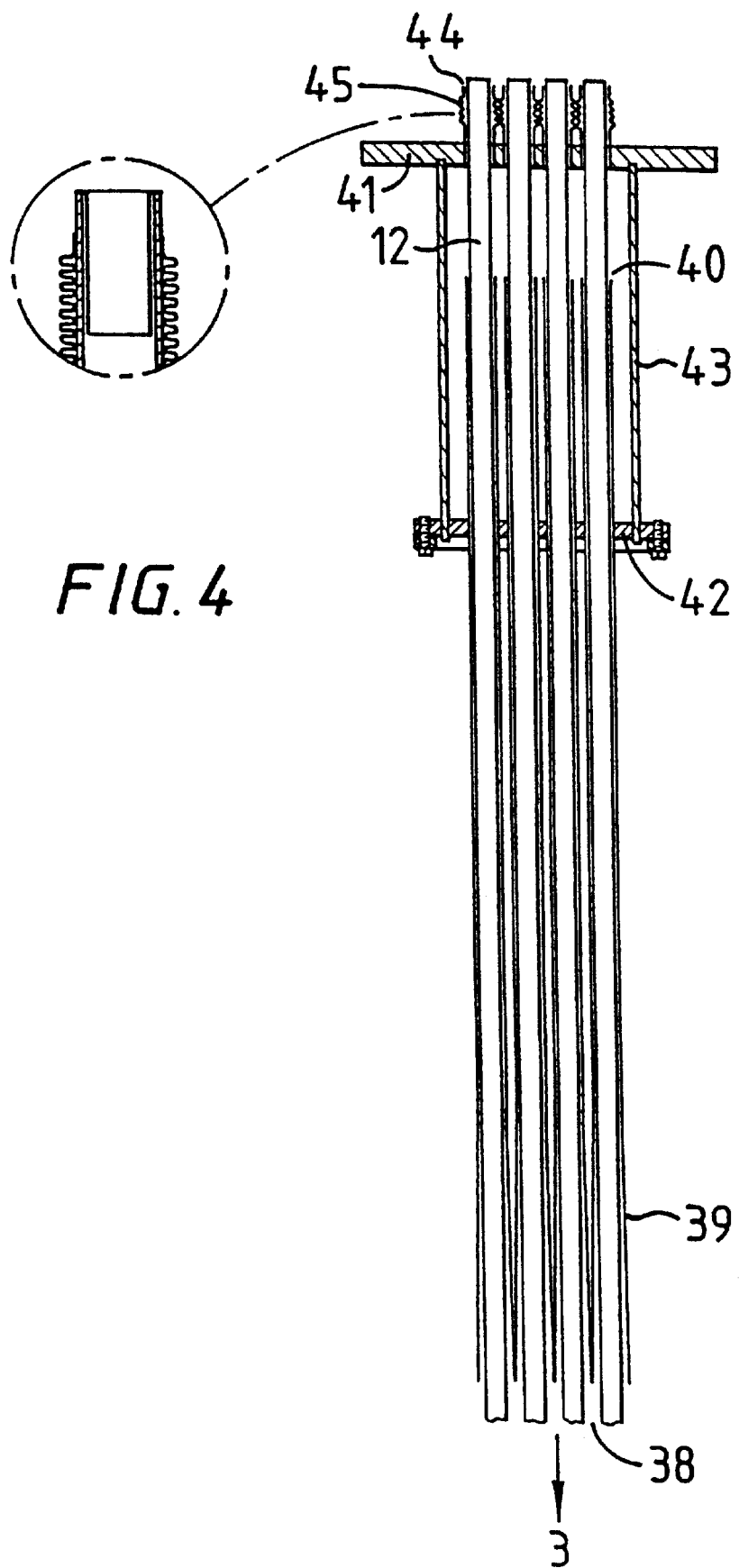
FIG.4 is a cross section through the combustion gas exit tubes of the apparatus.

Referring now to FIG. 1 a reactor 1 has elongate fuel tubes 2 extending through it, proceeding in the direction 3 to fuel burners (not shown) at one end, and at the other ends at junctions 4 distributed along a fuel manifold 5. Manifold 5 extends across the width of reactor 1 and projects through outer walls 6 of the reactor 1 connecting with flexible metal hose 7, which in turn leads via inlet tube 8 to a fuel source or sources. Inlet tubes 8 are located in annular tubes 9 located in orifices 11 in the outer wall 6. The fuel tubes 2 are distributed between endothermic tubes 12 (see the cross section 1A) in an array of alternating tubes; for clarity the endo tubes are only shown in the cross section. The array of tubes 2 is maintained in a square shroud 14 which is spaced from reactor 1 by support rings 20 to form an annulus 13; the rings 20 interact with support mountings 10 on the reactor wall 6. Fuel manifold 5 is supported by shroud 14.

The reactor 1 is supported externally. Below the fuel manifold 5 is a flanged base 15 attached to a dished flanged end cover 16. A side air inlet 46 in the shroud 14 is located between the levels of the fuel manifold 5 and support mounting 10; this side inlet 46 allows free movement for air from the annulus 13 between shroud 14 and reactor wall 6, in which at the downstream end of reactor 1 distant from cover 16 is an external air entry orifice 47. Endo gas product manifold 17 is located internally of cover 16 and is spaced from an exit port hole 18 by a bellows pipe 19.

In use, fuel, e.g. methane or hydrogen, passes into the reactor 1 via metal hose 7, fuel manifold 5, fuel tubes 2 and out into the reaction chamber, where the fuel is ignited usually autoignited. At the same time compressed air enters reactor 1 via said external air entry orifice 47 into the annulus 13 where it is preheated by to the fluids enclosed within the shroud 14 prior to entry through the side air inlet 46. The air passes between tubes 2 and 12 to become further preheated and then proceeds in the direction 3 to the fuel burners. For clarity detail of the features for the preheating are omitted (but see FIG.2).

FIG.2 shows the distribution of fuel and endo tubes 2 and 12 respectively in the square shroud 14 through the heat exchanger 21, which is subdivided into 41 transverse chambers 22. FIG. 2 shows five regions of the heat exchanger, regions 23–27 corresponding to 9, 8, 8, 8, 8 sets respectively of baffles 28 defining chambers 22. The numbers 2 and 3 in the baffles 28 designate the numbers of slots 29 in each umbers of slots alternate through the length of the exchanger 21. Sections 2A to 2E show the distribution of the first tubes 12 and fuel tubes 2 in the various 2 and 3 slot baffle arrangements. Section 2A shows the square shroud 14 with support ring 20 enclosing the tubes 12 and 2, which are spaced by baffle 28 which has two slots 29 between tubes 12 and through which pass fuel tubes 2; slots 29 are open. As shown Section 2A has two slots in a North South direction; section 2B has three slots 29 in the baffle 28, again in a N/S direction. Baffles 28 of the disposition in section 2A and 2B are in regions 23, 25 and 27 of the exchanger. Section 2C has two slots 29 in a baffle 28, the slots being in an East West direction, while section 2D has three slots 29 in baffles 28, the slots being in an East West direction; Baffles 28 of the disposition in sections 2C and 2D are in regions 24 and 26 of the exchanger. FIG.2 also shows schematically air distributors 30 above the exchanger 21.

FIG.3 shows the air distributors 30 in more detail with sections 3A, 3B, 3C and 3D. Fuel tubes 2 lead to burners and to the ignition zone. Above the uppermost two slot baffle 28 are three levels of perforated plate spoilers, a first spoiler 32 (of design shown in section 3A), a second spoiler 33 (see section 3B) and a third spoiler 34 (see section 3C). For clarity the endo tubes 12 are not shown in FIG.3 but only in sections 3A–3D. Referring now to section 3A, this is a top plan view of spoiler 32, showing fuel tubes 2 alternating with endo tubes 12 and offset thereto. Between two pairs of rows of endo tubes 12 are two perforated baffles 35, through which fuel tubes 2 project. In use, the upcoming preheated air emitted from the uppermost two slot baffle 28 passes towards the spoiler 32 where most air passes straight through the plane of the spoiler 32 but that under baffles 35 is diverted radially in a North South direction, apart from a small amount passing through the perforations. The upcoming air now reaches spoiler 33 as shown in section 3B, which is a top plan view. In spoiler 33 are five perforated baffles 36, between each row of endo tubes 12 and pierced by fuel tubes 2. The baffles are in a North South direction. In use the air from spoiler 32 passes through spoiler 33, except where baffles 36 restrict it and divert it, this time in a radial East West direction (apart from that moving through the perforations). Air then passes to spoiler 34 (see section 3C) which has five perforated baffles 37 in an East West direction between each row of endo tubes 12 and pierced by fuel tubes 2; baffles 37 divert upcoming air in a radial NS direction (apart from that moving through the perforations). Section 3D is a top plan view of the three spoilers 32-4 and their baffles 35-7 and shows that a very substantial part of the upcoming air passes through and/or is diverted by the baffles, the diversion movement being alternating between NS/EW/NS or EW/NS/EW.

FIG.4 shows combustion zone 38 interspaced by endo tubes 12, which downstream of the combustion zone 38 each pass through combustion annulus 39 of upwardly decreasing diameter surrounding endo tube 12 to accelerate the exiting combustion gases past the endo tubes. Above the annulus 39 is the exit manifold 40 for the combustion gas, the manifold being defined by upper and lower sheets 41 and 42 and side walls 43. Endo tubes 12 sealingly pass through upper sheet 41 into entry pipes 44 fitted externally with secondary bellows 45 to absorb thermal movements of the endo tubes.

The above detailed description is of one embodiment of the invention and is not meant to limit the scope of the invention in any way.

What is claimed is:

1. A heat exchanger, which comprises a first regular array of first heat exchange tubes extending through the exchanger and through a plurality of laterally extending heat exchanger chambers and a second regular array of second heat exchange tubes axially extending through the exchanger, two rows of said first heat exchange tubes being spaced by a row of said second heat exchange tubes, said plurality of heat exchanger chambers comprising a first chamber and a second and third chamber axially laterally adjacent thereto and on either side thereof, each chamber being separated from each adjacent chamber by a partition, in which are a plurality of discrete openings, and each chamber having a plurality of transverse interconnecting zones, each of which is defined by at least three of said first heat exchange tubes, a first partition and a second partition opposing said first partition, wherein the first chamber has amongst its zones at least two entry zones, each entry zone having an opening to entry from the second chamber, and at least two exit zones, each exit zone having an opening to exit to the third chamber, no zone having both an opening to entry and an opening to exit, and at least one entry zone is adjacent to at least one exit zone or is spaced from the exit zone by 1 third zone having neither an opening to entry nor an opening to exit.

2. An exchanger according to claim 1 wherein each of the transverse interconnecting zones is defined by at least four tubes.

3. An exchanger according to claim 1 wherein an entry zone is spaced by a third zone from an exit zone which is itself spaced by a further third zone from a further entry zone.

4. An exchanger according to claim 1 wherein an entry zone is adjacent to an exit zone which is itself adjacent to a further entry zone.

5. An exchanger according to claim 1 wherein in each chamber there are at least 4 zones extending in both lateral directions throughout the chamber and zero to one zones between each entry zone and each exit zone.

6. An exchanger according to claim 1 wherein said first and second tubes are in rows which are parallel in two directions at right angles to one another.

7. An exchanger according to claim 1 wherein the second tubes are of different diameter from said first tubes.

8. An exchanger according to claim 1 wherein the first and second partitions are substantially parallel.

9. An exchanger according to claim 1 wherein the entry or exit openings in the partitions are in the form of slots in sheets or plates.

10. An exchanger according to claim 9 wherein at least some of the partitions are plates with transverse slots therein.

11. Apparatus comprising a heat exchanger for said first fluid as claimed in claim 1 and a vessel comprising a distributor for distributing streams of said first fluid.

12. Apparatus comprising a heat exchanger for said first fluid as claimed in claim 1 wherein said first tubes are for hot endothermic reaction products in a heat exchange relationship with second tubes for a third fluid which is an exothermic reactant, and with said first fluid which is a second exothermic reactant, the first and third fluids being for subsequent exothermic reaction to provide heat for said endothermic reaction.

13. An exchanger according to claim 9 wherein the first and second partitions each comprise a series of parallel sided baffles wherein the series of baffles of said first and second partitions are parallel to one another but wherein sides of said baffles overlap when viewed in plan view such that there is no axial line of sight between successive chambers.

* * * * *